United States Patent
Armangau et al.

(10) Patent No.: US 12,511,156 B2
(45) Date of Patent: Dec. 30, 2025

(54) CREDIT-BASED SCHEDULING USING LOAD PREDICTION

(71) Applicant: Dell Products L.P., Round Rock, TX (US)

(72) Inventors: Philippe Armangau, Kalispell, MT (US); Maher Kachmar, Marlborough, MA (US); Christopher Jones, Plainville, MA (US); James McCoy, Holliston, MA (US)

(73) Assignee: Dell Products L.P., Round Rock, TX (US)

( * ) Notice: Subject to any disclaimer, the term of this patent is extended or adjusted under 35 U.S.C. 154(b) by 781 days.

(21) Appl. No.: 17/839,943

(22) Filed: Jun. 14, 2022

(65) Prior Publication Data

US 2023/0401089 A1 Dec. 14, 2023

(51) Int. Cl.
*G06F 9/50* (2006.01)
*G06F 9/48* (2006.01)

(52) U.S. Cl.
CPC .......... *G06F 9/4881* (2013.01); *G06F 9/5038* (2013.01); *G06F 2209/484* (2013.01); *G06F 2209/5019* (2013.01); *G06F 2209/5021* (2013.01)

(58) Field of Classification Search
CPC ............... G06F 9/4881; G06F 9/5038; G06F 2209/484; G06F 2209/5021; G06F 2209/5019; G06F 9/505
See application file for complete search history.

(56) References Cited

U.S. PATENT DOCUMENTS

| | | | | |
|---|---|---|---|---|
| 7,525,978 | B1 * | 4/2009 | Tabatabaee | H04L 49/205 370/414 |
| 7,752,415 | B2 * | 7/2010 | Vaupel | G06F 9/5077 718/104 |
| 8,327,103 | B1 | 12/2012 | Can et al. | |
| 10,146,469 | B2 * | 12/2018 | Polkovnikov | G06F 3/0647 |
| 10,628,216 | B2 * | 4/2020 | Miao | H04L 47/6275 |
| 10,678,480 | B1 | 6/2020 | Armangau et al. | |
| 10,949,257 | B2 * | 3/2021 | Kumar | G06F 9/4881 |
| 2010/0057967 | A1 * | 3/2010 | Murakami | G06F 13/24 710/267 |
| 2013/0054901 | A1 * | 2/2013 | Biswas | G06F 13/1642 711/E12.001 |
| 2019/0205164 | A1 * | 7/2019 | Kumar | G06F 9/5011 |
| 2021/0011765 | A1 * | 1/2021 | Doshi | G06F 9/5077 |
| 2022/0121484 | A1 | 4/2022 | Kamran et al. | |
| 2022/0222013 | A1 | 7/2022 | Shveidel et al. | |
| 2022/0365826 | A1 * | 11/2022 | Zhu | G06F 9/5072 |

* cited by examiner

*Primary Examiner* — Jorge A Chu Joy-Davila
*Assistant Examiner* — An-An Ngoc Nguyen
(74) *Attorney, Agent, or Firm* — BainwoodHuang

(57) ABSTRACT

A technique for scheduling tasks in a storage system includes predicting excess capacity of processing resources over a known interval of time and determining a quantity of credit based on the predicted capacity. The technique further includes holding back a requested increase in the priority of one or more speed-noncritical tasks by consuming a portion of the credit and thus allowing one or more speed-critical tasks to run with undiminished access to the processing resources.

20 Claims, 7 Drawing Sheets

CREDIT-BASED SCHEDULING USING LOAD PREDICTION

BACKGROUND

Data storage systems are arrangements of hardware and software in which storage processors are coupled to arrays of non-volatile storage devices, such as magnetic disk drives, electronic flash drives, and/or optical drives. The storage processors, also referred to herein as "nodes," service storage requests, arriving from host machines ("hosts"), which specify blocks, files, and/or other data elements to be written, read, created, deleted, and so forth. Software running on the nodes manages incoming storage requests and performs various data processing tasks to organize and secure the data elements on the non-volatile storage devices.

Storage systems typically perform a wide range of tasks having varying degrees of urgency. Some tasks require fast service, such as responding to I/O (input/output) requests from hosts, whereas other tasks can tolerate slower service, such as garbage collection, reference-count management, and some forms of deduplication.

Storage systems commonly employ schedulers to dynamically share system resources among various tasks. For example, a scheduler might allocate system resources, such as processor cycles, memory, cache, and the like, to respective tasks based on their relative priorities. According to this scheme, a scheduler might allocate a greater share of system resources to higher-priority tasks than to lower-priority tasks. But lower-priority tasks must generally be performed eventually and thus can become higher-priority if they are left with too small a share of system resources for too long.

SUMMARY

Unfortunately, conventional schedulers are typically unaware of the time-varying nature of storage-system demands. For example, a scheduler might respond to the current priorities of tasks and allocate resources according to those priorities. But this can mean that the scheduler might throttle back the processing of urgent I/O requests in favor of background tasks even though a period of host inactivity might be imminent. If only the scheduler could predict that the host load of I/O requests would soon decrease, the scheduler could sustain the high rate of I/O-request processing, as there would soon be a period of relative host inactivity when the background tasks could catch up. What is needed is a way of scheduling tasks that takes into account the time-varying nature of system demands.

To address this need at least in part, an improved technique for scheduling tasks in a storage system includes predicting excess capacity of processing resources over a known interval of time and determining a quantity of credit based on the predicted capacity. The technique further includes holding back a requested increase in the priority of one or more speed-noncritical tasks by consuming a portion of the credit and thus allowing one or more speed-critical tasks to run with undiminished access to the processing resources.

Advantageously, the improved technique enables speed-critical tasks to run with high performance, effectively by consuming excess capacity predicted to be available in the future and applying it to the speed-critical tasks in the present. The improved technique thus better enables storage systems to meet performance requirements.

Certain embodiments are directed to a method of scheduling tasks. The method includes dynamically sharing processing resources between speed-critical tasks and speed-noncritical tasks. The method further includes determining a quantity of credit based on a prediction of excess capacity of the processing resources during a determined time interval and, in response to a requested increase in priority of one or more of the speed-noncritical tasks during the determined time interval, temporarily preventing the increase in priority by consuming a portion of the credit, thereby enabling the speed-critical tasks temporarily to maintain substantially undiminished access to the processing resources.

Other embodiments are directed to a computerized apparatus constructed and arranged to perform a method of scheduling tasks, such as the method described above. Still other embodiments are directed to a computer program product. The computer program product stores instructions which, when executed on control circuitry of a computerized apparatus, cause the computerized apparatus to perform a method of scheduling tasks, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique for scheduling tasks in a storage system includes predicting excess capacity of processing resources over a known interval of time and determining a quantity of credit based on the predicted capacity. The technique further includes holding back a requested increase in the priority of one or more speed-noncritical tasks by consuming a portion of the credit and thus allowing one or more speed-critical tasks to run with undiminished access to the processing resources.

Figure 1:
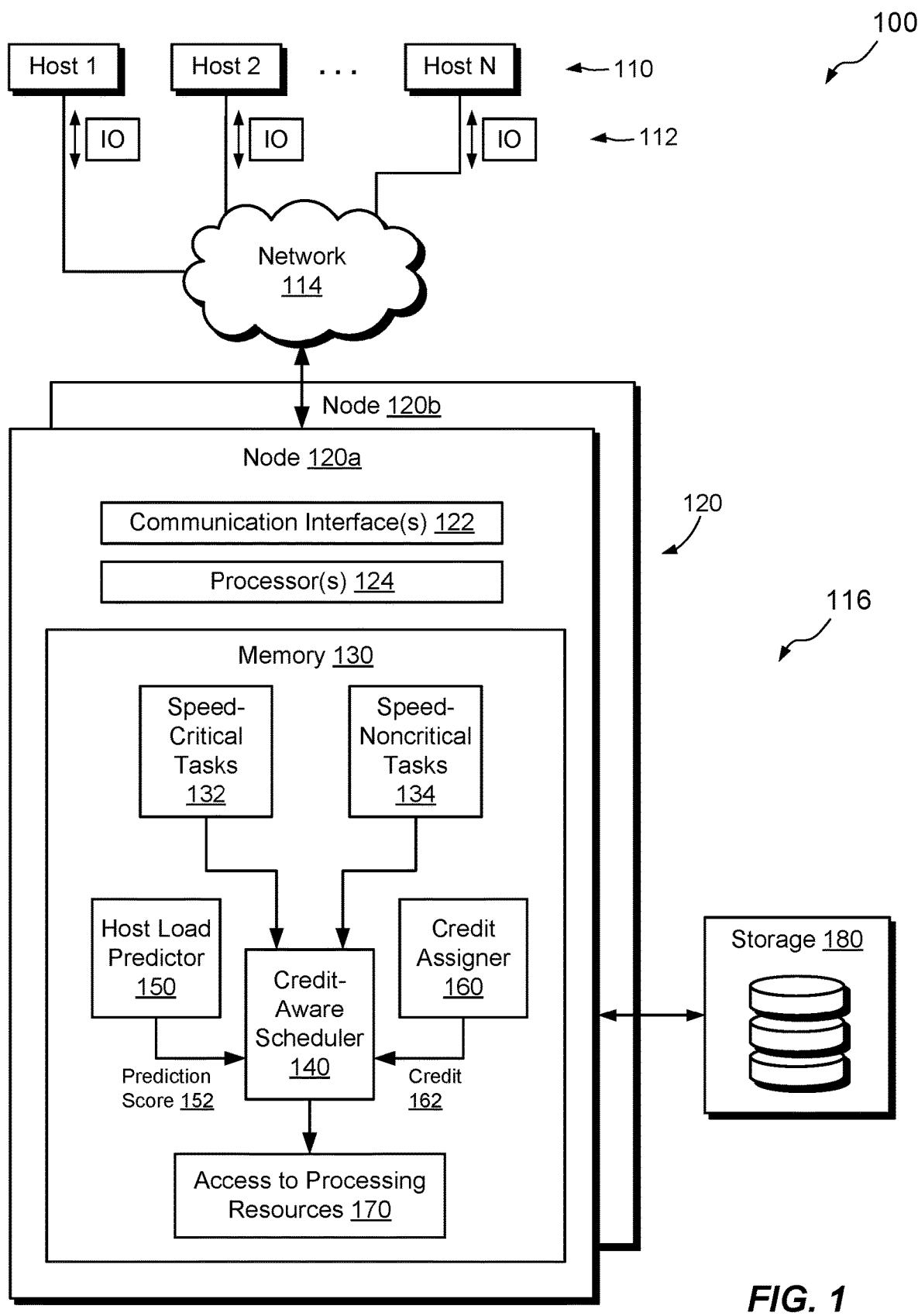
FIG. 1 is a block diagram of an example environment in which embodiments of the improved technique can be practiced.

FIG. 1 shows an example environment 100 in which embodiments of the improved technique can be practiced. Here, multiple hosts 110 are configured to access a data storage system 116 over a network 114. The data storage system 116 includes one or more nodes 120 (e.g., node 120a and node 120b), and storage 180, such as magnetic disk drives, electronic flash drives, and/or the like. Nodes 120 may be provided, for example, as circuit board assemblies, which plug into a chassis (not shown) that encloses and cools the nodes. The chassis has a backplane or midplane for interconnecting the nodes 120, and additional connections may be made among nodes 120 using cables. In some examples, the nodes 120 are part of a storage cluster, such as one which contains any number of storage appliances, where each appliance includes a pair of nodes 120 connected to shared storage 180. In some arrangements, a host application runs directly on the nodes 120, such that separate host machines 110 need not be present. No particular hardware configuration is required, however, as any number of nodes 120 may be provided, including a single node, in any arrangement, and the node or nodes 120 may be any type or types of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where separate hosts 110 are provided, such hosts 110 may connect to the SP 120 using various technologies, such as Fibre Channel, iSCSI (Internet small computer system interface), NVMeOF (Nonvolatile Memory Express (NVMe) over Fabrics), NFS (network file system), and CIFS (common Internet file system), for example. As is known, Fibre Channel, iSCSI, and NVMeOF are block-based protocols, whereas NFS and CIFS are file-based protocols. The nodes 120 are configured to receive I/O requests 112 according to block-based and/or file-based protocols and to respond to such I/O requests 112 by reading or writing the storage 180.

The depiction of node 120a is intended to be representative of all nodes 120. As shown, node 120a includes one or more communication interfaces 122, a set of processors 124, and memory 130. The communication interfaces 122 include, for example, SCSI target adapters and/or network interface adapters for converting electronic and/or optical signals received over the network 114 to electronic form for use by the node 120a. The set of processors 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, speed-critical tasks 132 and speed-noncritical tasks 134. Speed-critical tasks 132 include, for example, tasks for which fast responses are essential for meeting customer expectations. Examples may include tasks involved with receiving and responding to I/O requests 112. For read requests, speed-critical tasks 132 may include receiving a read request from a host, processing the request, and providing requested data back to the requesting host. For write requests, speed-critical tasks 132 may include persisting data specified by a write request and acknowledging successful completion of the write request to the requesting host once the data has been persisted. By comparison, speed-noncritical tasks 134 may include tasks for which fast responses are not essential for meeting customer expectations, but which nevertheless are important to complete eventually. Examples of speed-noncritical tasks 134 include tasks associated with destaging newly written data from a persistent staging area to more permanent structures in storage 180. Other examples of speed-noncritical tasks 134 may include those associated with garbage collection, reference-count management, certain types of deduplication, certain types of compression, and more generally to any tasks needed to be performed by the data storage system 116 on a non-urgent basis. The speed-critical tasks 132 and speed-noncritical tasks 134 may be arranged as threads, jobs, or in any other manner that organizes processing work. The tasks 132 and 134 may be arranged in respective queues or in other task-ordering structures.

As further shown in FIG. 1, the memory 130 further includes a credit-aware scheduler 140, a host load predictor 150, and a credit assigner 160. The credit-aware scheduler 140 is configured to dynamically share processing resources 170 of the data storage system 116 between the speed-critical tasks 132 and the speed-noncritical tasks 134. The processing resources 170 shared by the credit-aware scheduler 140 may include CPU (central processing unit) resources, memory space, cache space, and/or other resources that may be shared among processing tasks. As with conventional schedulers, the credit-aware scheduler 140 is configured to allocate processing resources to tasks based on priority, generally allocating more resources to higher-priority tasks and fewer resources to lower-priority tasks. Unlike conventional schedulers, however, the credit-aware scheduler 140 recognizes something we call "credit." For example, the credit-aware scheduler 140 is configured to apply credit 162 to prevent speed-noncritical tasks 134 from increasing their priority and partially displacing resources from speed-critical tasks 132, during times when the load presented by speed-critical tasks 132 is predicted to be lower in the near future.

To support the use of credit 162, the host load predictor 150 is configured to predict speed-critical tasks 132 in the future based on a history of speed-critical tasks 132 in the past. The term "host load" as used herein is synonymous with "speed-critical tasks 132." In an example, the host load predictor 150 is configured to observe host load during a training period that extends over multiple past intervals and to predict, based on the host load observed during those past intervals, the host load during a corresponding time interval in the future. Host load may be measured based on any number of factors, such as TOPS (I/O requests per second), CPU busyness, memory consumption, and/or cache fullness, for example. The host load predictor 150 may sample host load every minute, every 5 minutes, every 10 minutes, or the like, over the course of every day, every Monday, or any other repeating interval. The host load predictor 150 may then predict the host load during the next repeat of that interval, under the assumption that past patterns predict future behavior. To this end, host load predictor 150 may employ time-series analysis of past intervals and may use one or more prediction algorithms, such as exponential smoothing and/or ARIMA (Autoregressive Integrated Moving Average), to predict host load during a determined interval in the future. In some examples, the host load predictor 150 is further configured to generate a prediction score 152, which indicates a level of confidence in the predicted host load. The prediction score 152 may be determined in a variety of ways, such as by calculating a mean-square error of host load observed between past intervals and/or by calculating a correlation of host load observed between past intervals. In some examples, the credit-aware scheduler 140 is configured to consume credit 162 only when the prediction score 152 is high, e.g., only when the prediction score 152 exceeds a confidence threshold (e.g., a threshold between 50% and 100%).

The credit assigner 160 is configured to establish credit 162 based on predicted speed-critical tasks 132 (host load). For example, the predicted host load produced by the host load predictor 150 may indicate periods when the host load is expected to be low. These periods of low host load may correspond to times when users are offline or taking breaks, for example. The credit assigner 160 may identify these periods of low host load and assign credit 162 based on predicted "excess" capacity, i.e., the capacity of processing resources 170 that are predicted to be available after taking predicted host load into account.

Figure 2:
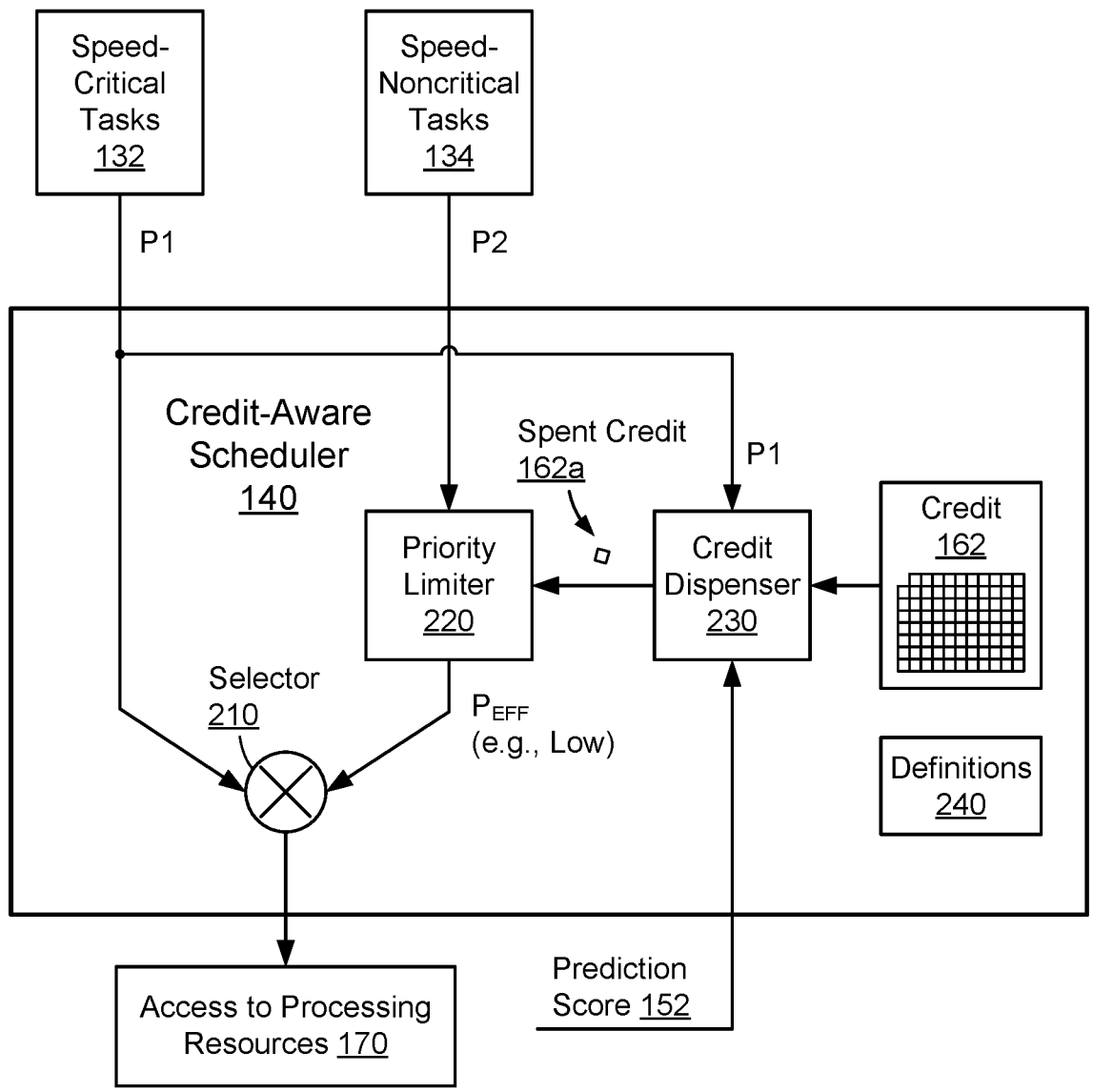
FIG. 2 is a block diagram of an example credit-aware scheduler as shown in FIG. 1.

FIG. 2 shows an example of the credit-aware scheduler 140 of FIG. 1 in greater detail. As shown, the credit-aware scheduler 140 includes a selector 210, a priority limiter 220, a credit dispenser 230, and definitions 240. The depicted features of FIG. 2 are shown schematically to facilitate understanding but are intended to be illustrative rather than limiting.

Selector 210 is configured to selectively allocate processing resources 170 to tasks based on respective priorities. Operation of selector 210 is thus similar to that of conventional schedulers. Priority limiter 220 and credit dispenser 230 significantly modify this conventional behavior. Priority limiter 220 is configured to limit the priority of speed-noncritical tasks 134 in exchange for credit 162. Credit dispenser 230 is configured to selectively dispense credit in proper amounts and under appropriate conditions.

In example operation, hosts 110 issue I/O requests 112 to the data storage system 116 (FIG. 1). Nodes 120 receive the I/O requests 112 at the communication interfaces 122 and initiate further processing. Such processing may include performing speed-critical tasks 132, such as responding to I/O requests 112 in real time to meet customer expectations, and speed-noncritical tasks 134, such as other tasks needed to organize and secure customer data.

The credit-aware scheduler 140 orchestrates execution of speed-critical tasks 132 and speed-noncritical tasks 134 in part by operation of selector 210. Selector 210 allocates access to processing resources 170 based on task priorities. For example, if the priority P1 of speed-critical tasks 132 is HIGH and the priority P2 of speed-noncritical tasks 134 is LOW, then selector 210 allocates a large majority of resource access to the speed-critical tasks 132 and a small minority of resource access to the speed-noncritical tasks 134. But if the priority of speed-noncritical tasks 134 increases while the priority of speed-critical tasks 132 stays HIGH, then selector 210 allocates access more equally. The effect of more equal access is that the share of system resources 170 available to speed-critical tasks 132 decreases, effectively slowing down the speed-critical tasks 132.

In accordance with improvements hereof, priority limiter 220 limits the priority of speed-noncritical tasks 134 in exchange for credit 162. For example, if the priority P2 of speed-noncritical tasks 134 starts out as LOW and then increases to MEDIUM (e.g., in response to an increase in processing debt of speed-noncritical tasks 134), then the priority limiter 220 may continue to present LOW effective priority $P_{EFF}$ to the selector 210, despite the request for MEDIUM priority, by consuming a portion 162a of the credit 162. The total amount of credit 162 is thus diminished by the consumed (spent) credit 162a. The priority limiter 220 therefore suppresses the priority of speed-noncritical tasks 134 in exchange for the spent credit 162a, enabling the speed-critical tasks 132 to maintain undiminished access to the processing resources 170. Rather than slowing down, as the speed-critical tasks 132 would normally do if a greater share of resources were diverted to the speed-noncritical tasks 134, the speed-critical tasks 132 instead maintain their high-speed operation.

Credit dispenser 230 selectively dispenses credit 162 in appropriate amounts as needed. In an example, each unit of credit 162 represents a share of processing resources 170 for an amount of time. Equivalently, each unit of credit 162 can be regarded as a difference in priority times a difference in time ($\Delta P^* \Delta T$). For instance, one unit of credit may be needed to suppress the priority of speed-noncritical tasks 134 by one level of priority (e.g., from MEDIUM to LOW) for one minute (or any suitable $\Delta T$). Likewise, two units of credit may be needed to suppress the priority of speed-noncritical tasks 134 by two levels of priority (e.g., from HIGH to LOW) for the same $\Delta T$. Credit dispenser 230 may thus operate in a time-based manner, checking requested priority P2 of speed-noncritical tasks 134 during each time period and dispensing the amount of credit 162 needed to suppress priority P2, preferably to suppress it to LOW. One should appreciate that priority may be represented in a variety of ways, of which LOW, MEDIUM, and HIGH are just an example. For instance, some implementations may present priority as a number ranging from 1 to 5, from 1 to 10, or in some other manner.

There are some conditions under which credit dispenser 230 may not dispense credit 162 at all, in which case the effective priority $P_{EFF}$ presented to selector 210 is just the requested priority P2. For example, if the prediction score 152 is low (does not exceed the confidence threshold), then the credit dispenser 230 may stop dispensing credit. A rationale for this behavior is that dispensing credit when prediction confidence is low risks significant misallocation of processing resources 170, as it is more likely that speed-noncritical tasks 134 will fall too far behind. Another condition under which the credit dispenser 230 may not dispense credit is when host load is low, or at least is not high (does not exceed a host-load threshold). Here, it would serve no purpose to consume credit in exchange for a greater share of processing resources 170 because a significant share of those resources is already available for speed-noncritical tasks 134. Yet another condition under which the credit dispenser 220 does not dispense credit is when credit 162 runs out. Credit 162 is a limited resource. In an example, credit 162 is established for a given time interval (a determined time interval over which a prediction is made). If credit 162 runs out before the determined time interval expires, then the credit-aware scheduler 140 may continue to run without credit for the remainder of the interval. Also, if any credit 162 remains when the determined time interval expires, such credit may be expunged (set to zero). As credit is computed only for the determined time interval (the predicted interval), it is properly applied only during that interval. In some examples, credit 162 for the determined time interval may be allocated to specific ranges of that interval. For example, the determined time interval may be divided into N ranges, with some portion of the credit allocated to each range. Any credit allocated to a range that is not used during the time period of that range may be expunged.

As indicated above, credit 162 is established based on a prediction of host load during a determined interval of time. That prediction is based on certain assumptions, such as what constitutes various levels of host load, e.g., what counts as idle, low, medium, and high host load. What counts as medium host load on one system might count as low host load on another system or on the same system at a different time. Thus, the accuracy of credit calculations may be enhanced through the use of definitions 240, which provide the conditions under which the prediction of host load was acquired (e.g., what was counted as low, medium, and high host load). Use of definitions 220 thus enables predictions made under one set of system conditions to be applied accurately during a current set of system conditions.

Figure 3A:
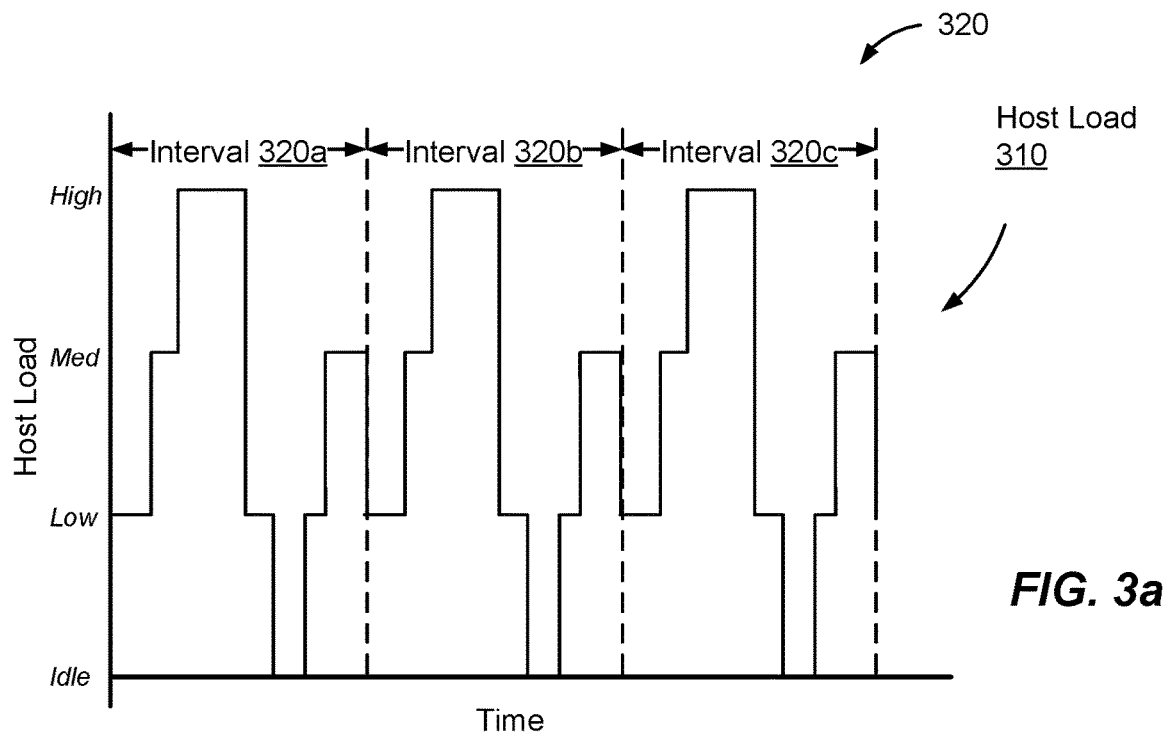
FIGS. 3a and 3b are respective graphs showing a training set of host load behavior (FIG. 3a) and a prediction of host load based on the training set (FIG. 3b).
Figure 3B:
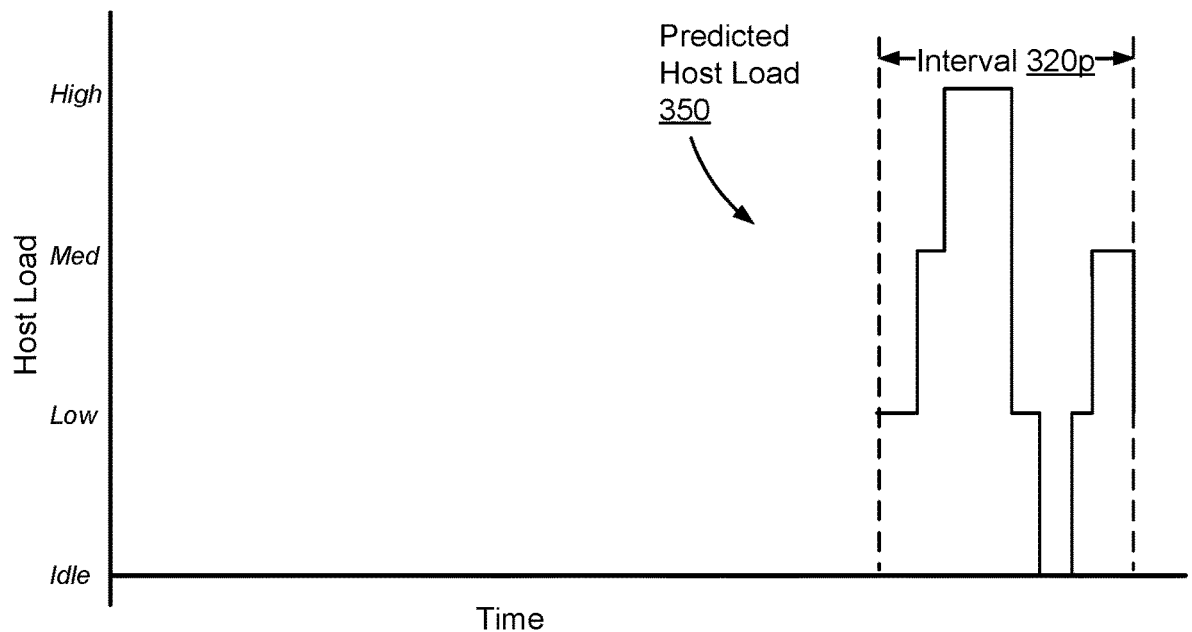

FIGS. 3a and 3b show example operation of the host load predictor 150 of FIG. 1. As shown in FIG. 3a, host load 310 in a data storage system may be monitored during a training period that extends over corresponding time intervals 320, such as intervals 320a, 320b, and 320c. Although three intervals 320 are shown in FIG. 3a, a greater or fewer number of intervals 320 may be monitored. The intervals 320 are "corresponding" in the sense that they relate to a common timespan. For example, each interval 320 may correspond to a full day, to a certain range of hours during a day (e.g., 9 am to 5 pm on weekdays), or to the same day of the week (e.g., every Monday), for example. Thus, there is no need for intervals 320 to be contiguous, although the intervals 320 may be contiguous in some examples.

The host load 310 may be measured based on any number of factors. These may include, for example, TOPS, CPU load, memory utilization, cache fullness, and/or other factors. Preferably, the factors are combined in such a way as to yield an accurate estimate of processing resources 170 consumed for the purpose of servicing speed-critical tasks 132. Example ways of combining factors may include weighted sums, neural networks, fuzzy logic, and/or other estimation techniques.

In an example, the host load 310 depicted in FIG. 3a is sampled during periods when speed-noncritical tasks 134 are idle, or mostly idle. Sampling host load in this manner best enables an estimate to be formulated of excess capacity, i.e., the capacity of processing resources 170 available for speed-noncritical tasks 134.

Samples may be acquired on a regular basis, such as every minute, every 5 minutes, every 10 minutes, and so forth. Although samples may correspond to specific points in time, samples preferably reflect accumulated load over a sampling period.

Sampled host load may be normalized. For example, host load may be determined initially with a high level of numerical precision but may be rounded for purposes of prediction into categories, such as idle, low, medium, and high, for example. Respective thresholds may be applied for distinguishing idle from low, low from medium, and medium from high. Such thresholds may be provided in the definitions 220 described in connection with FIG. 2.

The results of sampling and normalization is to produce a historical pattern of host load, which reflects the host load 310 over the intervals 320. The historical pattern may then be used to predict a future interval.

FIG. 3b shows an example prediction 350 of host load during a determined time interval 320p in the future. The determined interval 320p corresponds to the intervals 320a, 320b, and 320c the same way that those intervals correspond to one another, i.e., by relating to the same timespans. For example, if intervals 320a, 320b, and 320c correspond to past Mondays, then predicted interval 320p corresponds to a future Monday. Predicted host load 350 may be computed using time-series analysis, such as using exponential smoothing, ARIMA, and/or other prediction techniques. In the example shown, predicted host load 350 is similar to those observed during the sampled intervals 320a, 320b, and 320c. Host load starts out as low, increases to medium, increases to high, drops to low, drops to idle, increases to low, increases to medium, and then drops to low. It can be seen that the prediction score 152 is likely to be high for this example because the load is periodic and closely matches the sampled intervals.

Figure 4A:
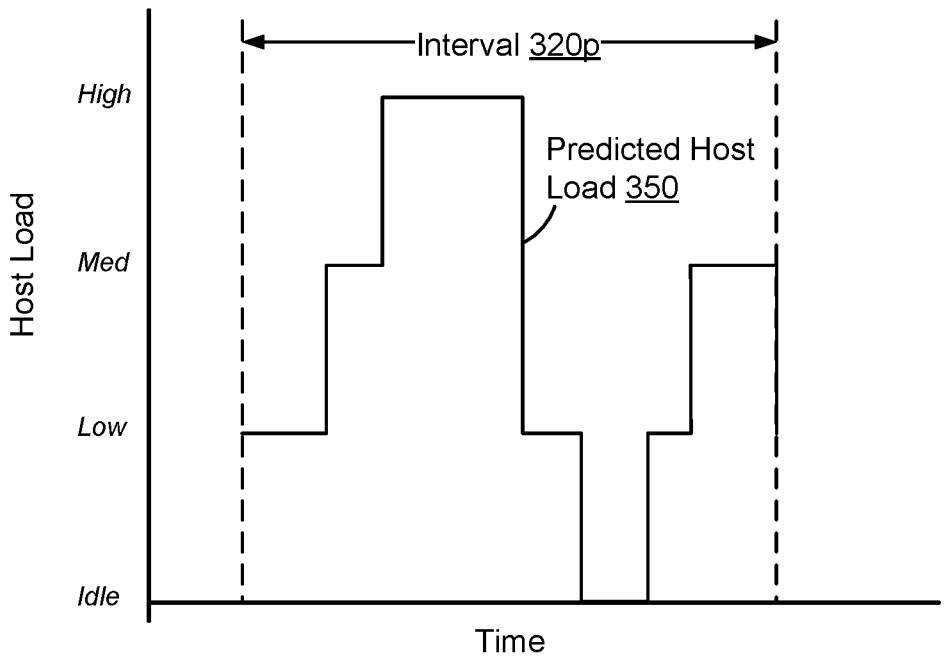
FIGS. 4a through 4d are respective graphs showing an example arrangement for calculating and allocating credit.
Figure 4B:
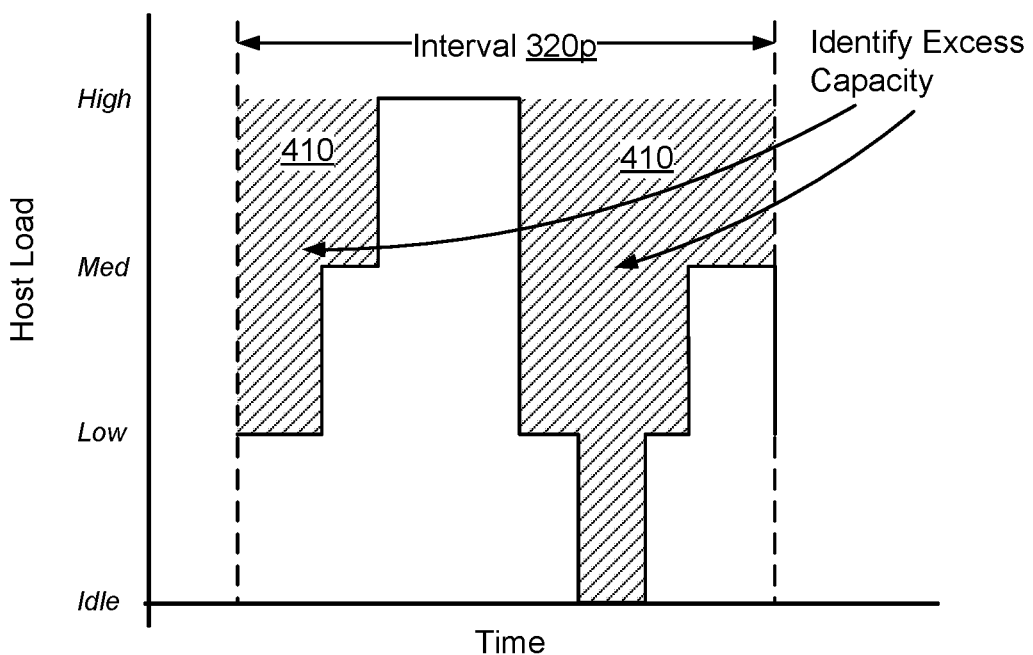

FIGS. 4a-4d show example operation of the credit assigner 160. As shown in FIG. 4a, credit assigner 160 begins by accessing the predicted host load 350, which is the same as that shown in FIG. 3b. As shown in FIG. 4b, credit assigner 160 identifies excess capacity 410 during the determined interval 320p as unused load capacity. The excess capacity 410 (shown in hash marks) may be calculated simply as the capacity of processing resources not predicted to be used during the determined interval 320p, i.e., the total level of processing capacity minus the predicted host load 350. Such excess capacity 410 may also be regarded as the area over the curve 350, i.e., the area between the predicted host load 350 and the "High" level indicated by the graph.

Figure 4C:
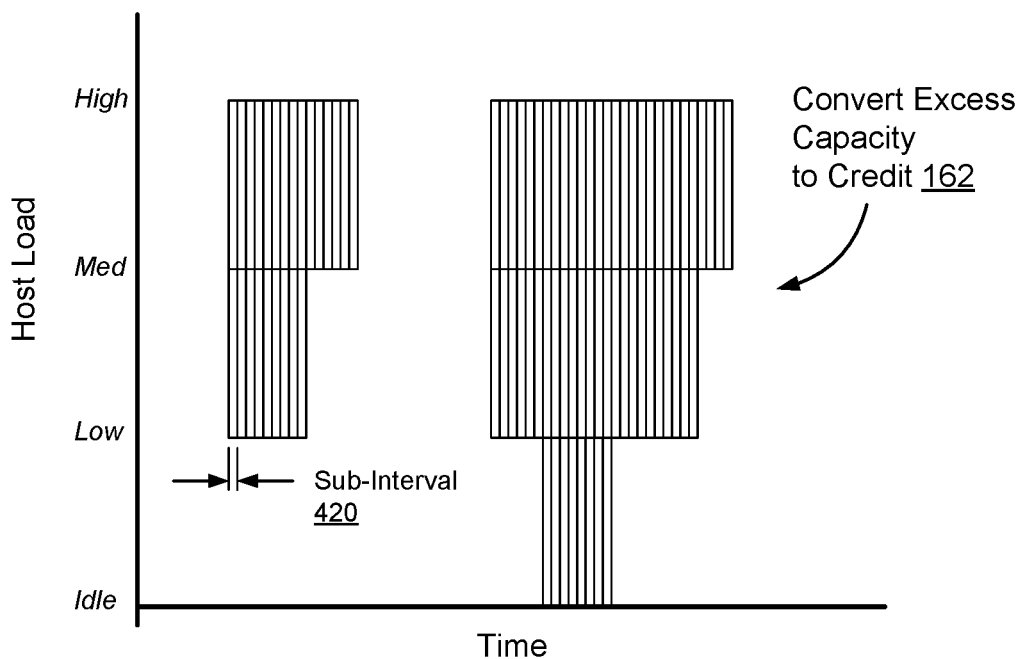

FIG. 4c shows an example way of assigning credit 162 based on the determined excess capacity 410. Here, excess capacity 410 is represented by elongated rectangles. The height of each rectangle is one unit of host load, which may be taken simply as the difference between any two adjacent levels of host load (idle and low, low and medium, or medium and high). The width of each rectangle is one unit of time, represented by sub-interval 420. For example, the determined interval 320p may be divided into multiple sub-intervals 420. Each sub-interval 420 may correspond to the sampling period used to acquire samples (FIG. 3a), but this is not required. With the depicted approach, excess capacity for each sub-interval 420 is just the number of rectangles (0, 1, 2, or 3) in each sub-interval 420, and the total excess capacity 410 is the sum across all sub-intervals. In this manner, the total credit 162 may be assigned for the determined time interval 320p based on the total number of rectangles. For example, the assigned credit 162 may equal the total number of rectangles or may be mathematically related to the total number of rectangles in some determined manner.

Figure 4D:
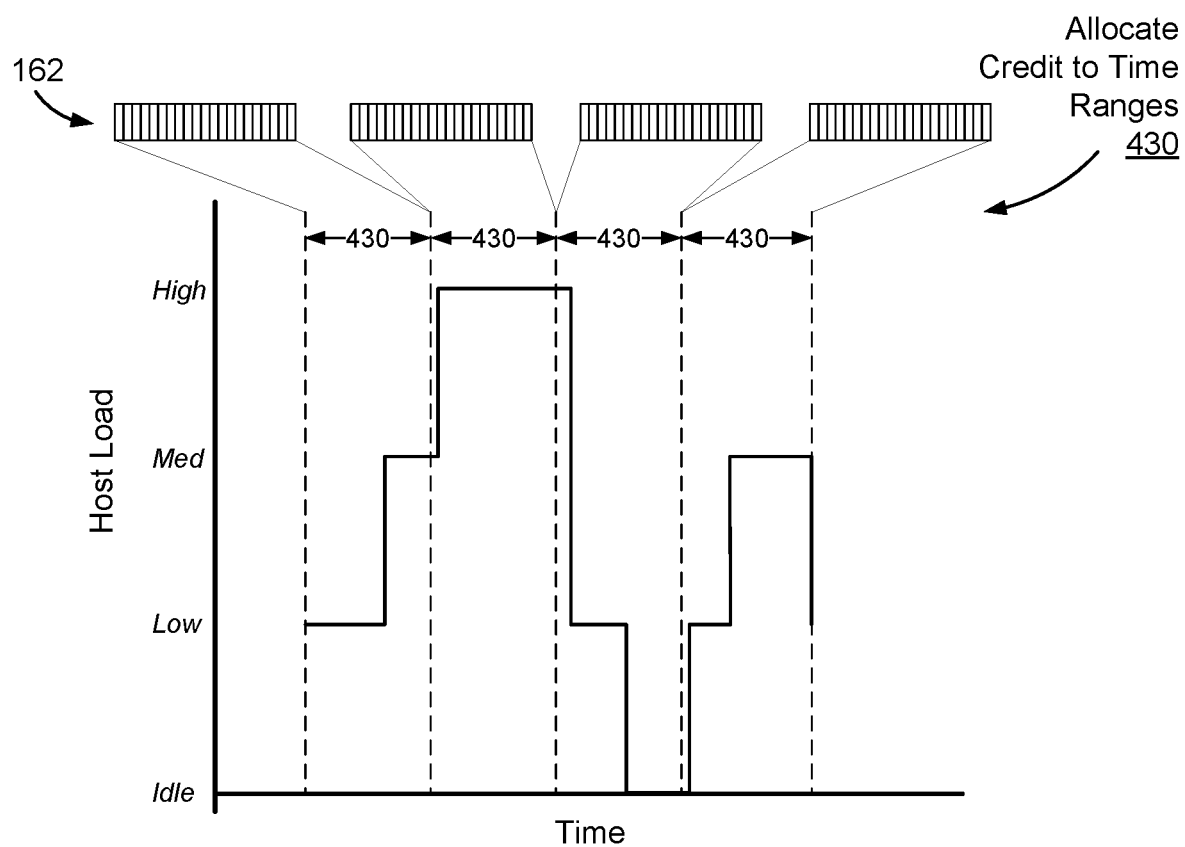

FIG. 4d shows an optimization that may be used in some examples. Here, the total credit 162 (as determined using the FIG. 4c approach) is allocated to respective time ranges 430. For example, the determined interval 320p may be divided into any suitable number of ranges 430 (such as four ranges) and the determined credit 162 may be divided evenly among the ranges. When dividing credit 162, the nodes 120 may limit the credit allowed to be consumed during each range to the amount of credit allocated to that range. Proceeding in this manner limits risk by avoiding a situation in which all of the credit 162 for the entire interval 320*p* is consumed all at once. Although FIG. 4*d* shows credit 162 as being evenly distributed among the ranges 430, this is just an example. Alternatively, credit may be distributed in an uneven manner, such as by allocating more credit during times of high predicted host load and less credit during times of low predicted host load. In addition, ranges 430 need not be uniform in length.

Figure 5:
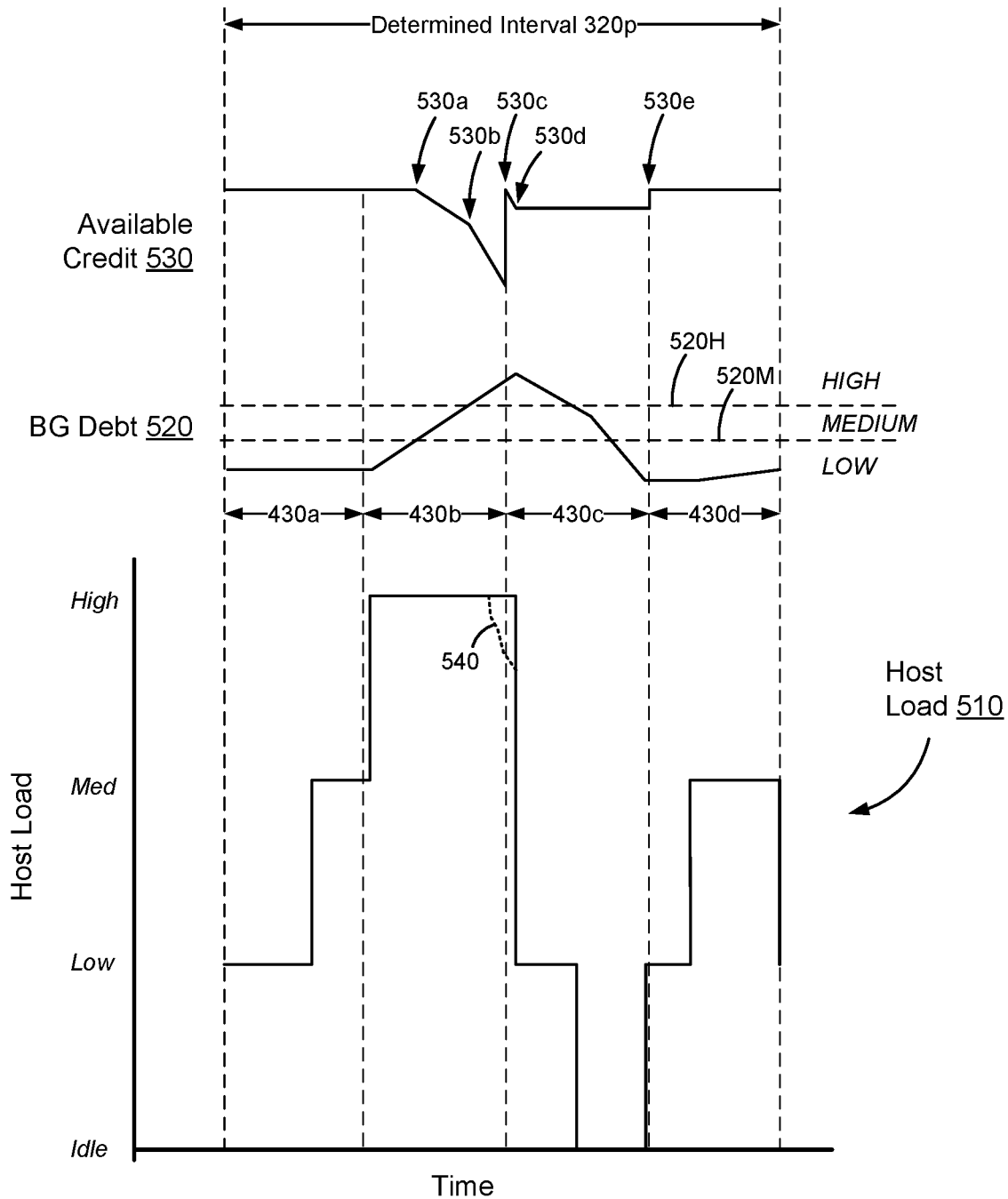
FIG. 5 is a graph showing example behavior of multiple aspects of a data storage system that employs a credit-aware scheduler.

FIG. 5 shows example real-time behavior of the credit-aware scheduler 140 in the data storage system 116. Here, host load 510 depicts the actual host load in the data storage system 116 during the determined interval 320*p* and thus represents the current processing level of speed-critical tasks 132. The actual host load 510 corresponds closely to the predicted host load 350. Also shown in FIG. 5 are background debt 520, which represents an accumulated level of speed-noncritical tasks 134, e.g., background tasks that await processing, and available credit 530. Here, a total amount of credit 162 has been allocated equally to four time ranges 430 (430*a*-430*d*). Background debt 520 corresponds to requested background priority P2 (FIG. 2), which may be LOW, MEDIUM, or HIGH. Threshold 520M distinguishes LOW priority from MEDIUM priority, and threshold 520H distinguishes MEDIUM priority from HIGH priority.

During the first time range 430*a*, host load 510 and background debt 520 both start out as low and available credit 530 starts at maximum. Later in time range 530*a*, host load 510 increases to medium, but background debt 520 remains low and thus no available credit 530 is consumed. At the end of the first time range 430*a*, available credit is zeroed but it is immediately set to the allocated amount for the second time range 430*b* (no change shown).

During the second time range 430*b*, host load 510 increases from medium to high, causing fewer processing resources 170 to be available for speed-noncritical tasks 134. Background debt 520 starts to rise and eventually crosses threshold 520M, thus transitioning from a level corresponding to LOW priority to a level corresponding to MEDIUM priority. Rather than granting additional priority to speed-noncritical tasks 134, however, the credit-aware scheduler 140 instead suppresses the priority of the speed-noncritical tasks 134 (keeping it LOW) in exchange for credit. Credit dispenser 230 begins dispensing credit point 530*a*, effectively paying credit in exchange for keeping the effective priority $P_{EFF}$ (FIG. 2) at LOW. Background debt 520 continues to increase, eventually crossing threshold 520H and entering the region where the priority of speed-noncritical tasks 134 is HIGH. At this time, shown as point 530*b*, credit dispenser 230 increases the rate of dispensing available credit 530. For example, credit dispenser 230 pays twice as much credit for suppressing the priority of speed-noncritical tasks 134 from HIGH to LOW as it paid to suppress it from MEDIUM to LOW. At point 530*c*, the second time range 430*b* ends and the available credit 530 is reset to the allocated amount of credit for the third time range 430*c*.

At the beginning of the third time range 430*c*, background debt 520 remains at a level corresponding to HIGH priority, and thus credit dispenser 230 continues paying credit at the same rate as before. At point 530*d*, host load 510 drops from high to low, thus freeing considerable processing resources 170 for speed-noncritical tasks 134. The credit dispenser 230 stops dispensing available credit 530 and background debt 520 begins to drop. At about the middle of time range 430*c*, the host load 510 becomes idle and background debt 520 begins dropping faster. At the end of time range 430*c*, available credit 530 is reset to the allocated amount for the fourth time range 430*d* (point 530*e*).

During time range 430*d*, host load 510 increases to low and then to medium, but no available credit 530 is spent as the level of background debt 520 remains in the LOW priority region.

Operation of the credit-aware scheduler 140 thus allows speed-critical tasks 132 to maintain undiminished access to processing resources 170, enabling the speed-critical tasks 132 to meet customer expectations. Without the credit-aware scheduler 140, host load 510 might suffer degraded performance, such as that depicted by curve 540. Rather than suffering such degraded performance, the storage system is able to maintain high performance without sacrificing background tasks.

Figure 6:
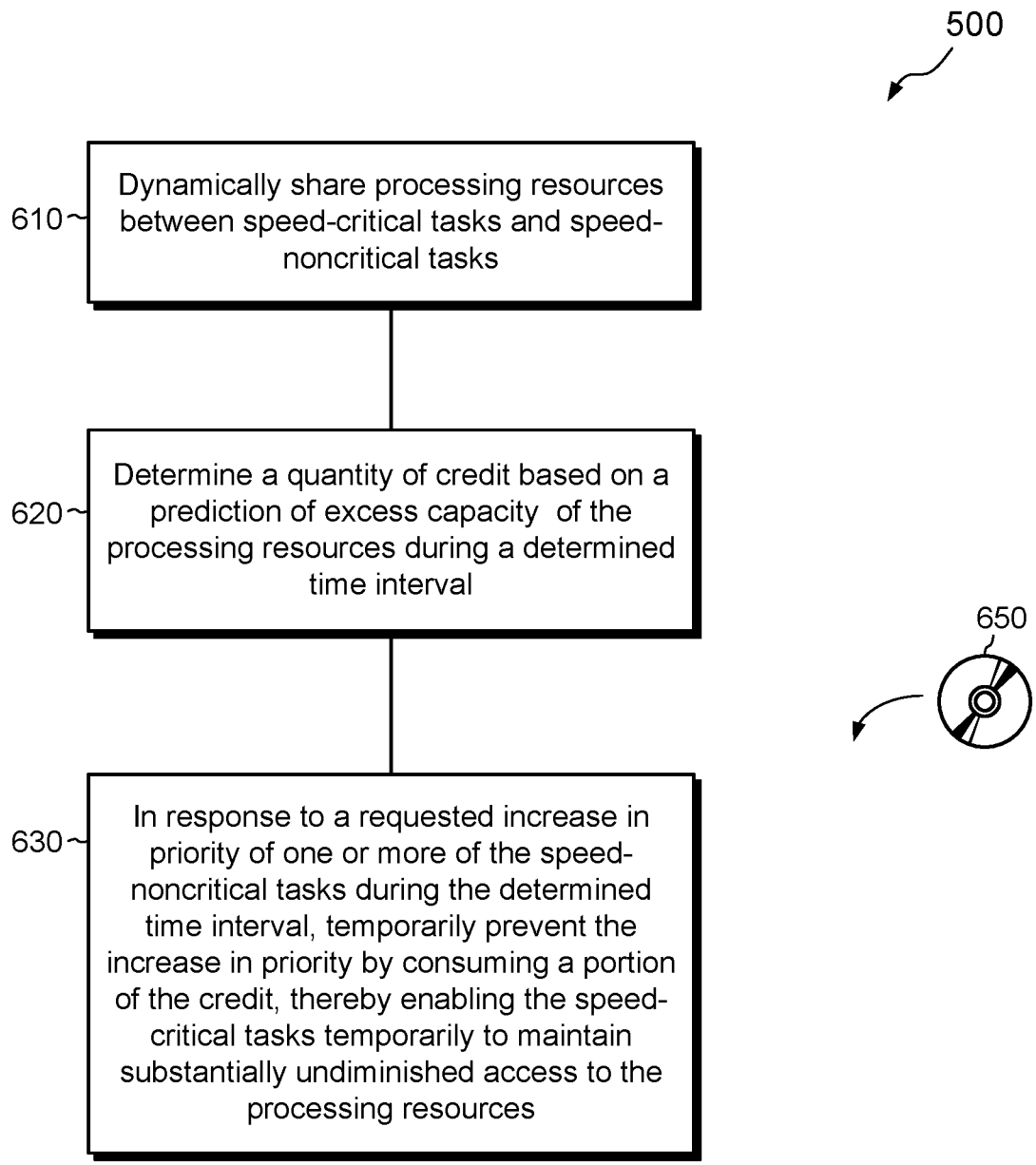
FIG. 6 is a flow chart showing an example method of scheduling tasks.

FIG. 6 shows an example method 600 that may be carried out in connection with the environment 100. The method 600 is typically performed, for example, by the software constructs described in connection with FIG. 1, which reside in the memory 130 of the node 120*a* and are run by the set of processors 124. The various acts of method 600 may be ordered in any suitable way. Accordingly, embodiments may be constructed in which acts are performed in orders different from that illustrated, which may include performing some acts simultaneously.

At 610, processing resources 170 are dynamically shared between speed-critical tasks 132 and speed-noncritical tasks 134. For example, selector 210 (FIG. 2) dynamically allocates access to processing resources 170 by speed-critical tasks 132 and speed-noncritical tasks 134 based on relative priorities.

At 620, a quantity of credit 162 is determined based on a prediction of excess capacity 410 of the processing resources 170 during a determined time interval 320*p*. The credit 162 may be determined by credit assigner 160, based on the prediction 410 of excess capacity, as obtained based on action of the host load predictor 150.

At 630, in response to a requested increase in priority P2 of one or more of the speed-noncritical tasks 134 during the determined time interval 320*p*, the increase in priority is temporarily prevented by consuming a portion 162*a* of the credit 162, thereby enabling the speed-critical tasks 132 temporarily to maintain substantially undiminished access to the processing resources 170.

An improved technique has been described for scheduling tasks in a storage system. The technique includes predicting excess capacity 410 of processing resources 170 over a known interval of time 320*p* and determining a quantity of credit 162 based on the predicted capacity 410. The technique further includes holding back a requested increase in the priority of one or more speed-noncritical tasks 134 by consuming a portion 162*a* of the credit 162 and thus allowing one or more speed-critical tasks 132 to run with undiminished access to the processing resources 170.

Having described certain embodiments, numerous alternative embodiments or variations can be made. For example, embodiments have been described in connection with a data storage system. This is merely an example, however, as embodiments may also be provided in any computing system that performs both speed-critical tasks and speed-noncritical tasks.

Also, although embodiments have been described that involve one or more data storage systems, other embodiments may involve computers, including those not normally regarded as data storage systems. Such computers may include servers, such as those used in data centers and enterprises, as well as general purpose computers, personal computers, and numerous devices, such as smart phones, tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of scheduling tasks, comprising:
   dynamically sharing processing resources between speed-critical tasks and speed-noncritical tasks;
   determining a quantity of credit associated with the speed-critical tasks based on a prediction of excess capacity of the processing resources during a determined time interval;
   in response to a requested increase in priority of one or more of the speed-noncritical tasks during the determined time interval, preventing the increase in priority in exchange for consuming a portion of the credit associated with the speed-critical tasks, thereby enabling the speed-critical tasks to maintain undiminished access to the processing resources; and
   executing the speed-critical tasks with the undiminished access to the processing resources based on consuming the portion of credit,
   wherein the portion of credit consumed is based on a degree of the requested increase in priority and an amount of time over which the requested increase in priority is prevented from being granted.

2. The method of claim 1, wherein preventing the increase in priority of the speed-noncritical tasks by consuming the portion of credit is responsive to the prediction of excess capacity being associated with a prediction score that exceeds a confidence threshold.

3. The method of claim 1, wherein the speed-critical tasks present a processing load that varies over time, and wherein preventing the increase in priority of the speed-noncritical tasks by consuming the portion of credit is responsive to the load of the speed-critical tasks exceeding a threshold.

4. The method of claim 1, further comprising providing the prediction of excess capacity based on a training period in which speed-noncritical tasks are idle.

5. The method of claim 4, wherein determining the quantity of credit includes: calculating the excess capacity based on a difference between a total level of processing capacity during the determined time interval and a prediction of processing load during the determined time interval; and converting the excess capacity into the quantity of credit.

6. The method of claim 5, further comprising generating the prediction of processing load based on multiple factors, the factors including IOPS (input/output requests per second) and CPU (central processing unit) load.

7. The method of claim 5, wherein the determined time interval includes a plurality of time ranges, and wherein the method further comprises:
   dividing the quantity of credit into multiple shares of credit;
   allocating the shares to respective time ranges of the plurality of time ranges; and
   limiting an amount of credit that can be consumed during a particular time range to the share of credit allocated to the particular time range.

8. The method of claim 5,
   wherein providing the prediction of excess capacity includes providing multiple predicted values of excess capacity for respective sub-intervals of the determined time interval,
   wherein calculating the excess capacity includes determining excess capacities for respective sub-intervals and summing the determined excess capacities across the sub-intervals, and
   wherein converting the excess capacity into the quantity of credit includes assigning credit on a sub-interval basis.

9. The method of claim 1, further comprising generating the prediction of excess capacity during the determined interval based on a time-series analysis of load resulting from execution of speed-critical tasks during a set of corresponding past intervals.

10. The method of claim 1, wherein the speed-critical tasks include tasks associated with issuing responses to I/O requests received by a data storage system from hosts, and wherein the speed-noncritical tasks include background tasks performed by the data storage system.

11. A computerized apparatus, comprising control circuitry that includes a set of processors coupled to memory, the control circuitry constructed and arranged to:
dynamically share processing resources between speed-critical tasks and speed-noncritical tasks;
determine a quantity of credit associated with the speed-critical tasks based on a prediction of excess capacity of the processing resources during a determined time interval;
in response to a requested increase in priority of one or more of the speed-noncritical tasks during the determined time interval, prevent the increase in priority in exchange for consuming a portion of the credit associated with the speed-critical tasks, thereby enabling the speed-critical tasks to maintain undiminished access to the processing resources; and
execute the speed-critical tasks with the undiminished access to the processing resources based on consuming the portion of credit,
wherein the portion of credit consumed is based on a degree of the requested increase in priority and an amount of time over which the requested increase in priority is prevented from being granted.

12. A computer program product including a set of non-transitory, computer-readable media having instructions which, when executed by control circuitry of a computerized apparatus, cause the computerized apparatus to perform a method of scheduling tasks, the method comprising:
dynamically sharing processing resources between speed-critical tasks and speed-noncritical tasks;
determining a quantity of credit associated with the speed-critical tasks based on a prediction of excess capacity of the processing resources during a determined time interval;
in response to a requested increase in priority of one or more of the speed-noncritical tasks during the determined time interval, preventing the increase in priority by consuming a portion of the credit associated with the speed-critical tasks, thereby enabling the speed-critical tasks to maintain undiminished access to the processing resources; and
executing the speed-critical tasks with the undiminished access to the processing resources based on consuming the portion of credit,
wherein the portion of credit consumed is based on a degree of the requested increase in priority and an amount of time over which the requested increase in priority is prevented from being granted.

13. The computer program product of claim 12, wherein preventing the increase in priority of the speed-noncritical tasks by consuming the portion of credit is responsive to the prediction of excess capacity being associated with a prediction score that exceeds a confidence threshold.

14. The computer program product of claim 12, wherein the speed-critical tasks present a processing load that varies over time, and wherein preventing the increase in priority of the speed-noncritical tasks by consuming the portion of credit is responsive to the load of the speed-critical tasks exceeding a threshold.

15. The computer program product of claim 12, further comprising providing the prediction of excess capacity based on a training period in which speed-noncritical tasks are idle.

16. The computer program product of claim 15, wherein determining the quantity of credit includes:
calculating the excess capacity based on a difference between a total level of processing capacity during the determined time interval and a prediction of processing load during the determined time interval; and
converting the excess capacity into the quantity of credit.

17. The computer program product of claim 12, wherein the speed-critical tasks include tasks associated with issuing responses to I/O requests received by a data storage system from hosts, and wherein the speed-noncritical tasks include background tasks performed by the data storage system.

18. The computer program product of claim 16, wherein the method further comprises generating the prediction of processing load based on multiple factors, the factors including IOPS (input/output requests per second) and CPU (central processing unit) load.

19. The computer program product of claim 16, wherein the determined time interval includes a plurality of time ranges, and wherein the method further comprises:
dividing the quantity of credit into multiple shares of credit;
allocating the shares to respective time ranges of the plurality of time ranges; and
limiting an amount of credit that can be consumed during a particular time range to the share of credit allocated to the particular time range.

20. The computer program product of claim 12, wherein the method further comprises generating the prediction of excess capacity during the determined interval based on a time-series analysis of load resulting from execution of speed-critical tasks during a set of corresponding past intervals.

* * * * *